(No Model.) 4 Sheets—Sheet 1.
W. H. MURRAY.
DEVICE FOR REGULATING THE TEMPERATURE OF AIR
No. 450,869. Patented Apr. 21, 1891.

Witnesses:
J. B. McGinn.
M. B. May.

Inventor:
William H. Murray.
by Holliday & Bliss
atty (No Model.) 4 Sheets—Sheet 3.

W. H. MURRAY.
DEVICE FOR REGULATING THE TEMPERATURE OF AIR

No. 450,869. Patented Apr. 21, 1891.

(No Model.) 4 Sheets—Sheet 4.
W. H. MURRAY.
DEVICE FOR REGULATING THE TEMPERATURE OF AIR No. 450,869. Patented Apr. 21, 1891.

Witnesses:
J.B. McGill.
M. B. May.

Inventor:
William H. Murray

UNITED STATES PATENT OFFICE.

WILLIAM HENRY MURRAY, OF CHICAGO, ILLINOIS.

DEVICE FOR REGULATING THE TEMPERATURE OF AIR.

SPECIFICATION forming part of Letters Patent No. 450,869, dated April 21, 1891.

Application filed October 31, 1889. Renewed March 24, 1891. Serial No. 386,261. (No model.)

*To all whom it may concern:*

Be it known that I, WILLIAM HENRY MURRAY, a citizen of the United States, residing at Chicago, in the county of Cook and State of Illinois, have invented certain new and useful Improvements in Devices for Regulating the Temperature of Air and Water, of which the following is a specification, reference being had therein to the accompanying drawings.

This invention relates to an improved construction and arrangement of devices for treating air in respect to its temperature and at the same time treating a body of water in the same respect, the object being to initially apply a comparatively high heat to a body of air for the purpose of insuring that every particle thereof shall be elevated in temperature to the degree ultimately required, or for the purpose of causing the high heat to destroy or remove all foreign bodies, or for the purpose of effecting by said heat a decomposition and removal of the moisture in the air, or for all of said purposes conjointly, and subsequently cooling the said body of air to the point at which it is desired to use it in applying it for drying or other purposes, and in parallelism with the above utilize the surplus heat—that is, heat which at the high temperature necessary may be wasted in relation to action on the air—in raising the temperature of a body of water in a boiler adjacent to the chambers in which the air is initially heated and supply to said boiler water from chambers in proximity to the ducts wherein the air is located at the time it is secondarily lowered in temperature.

Figure 1:
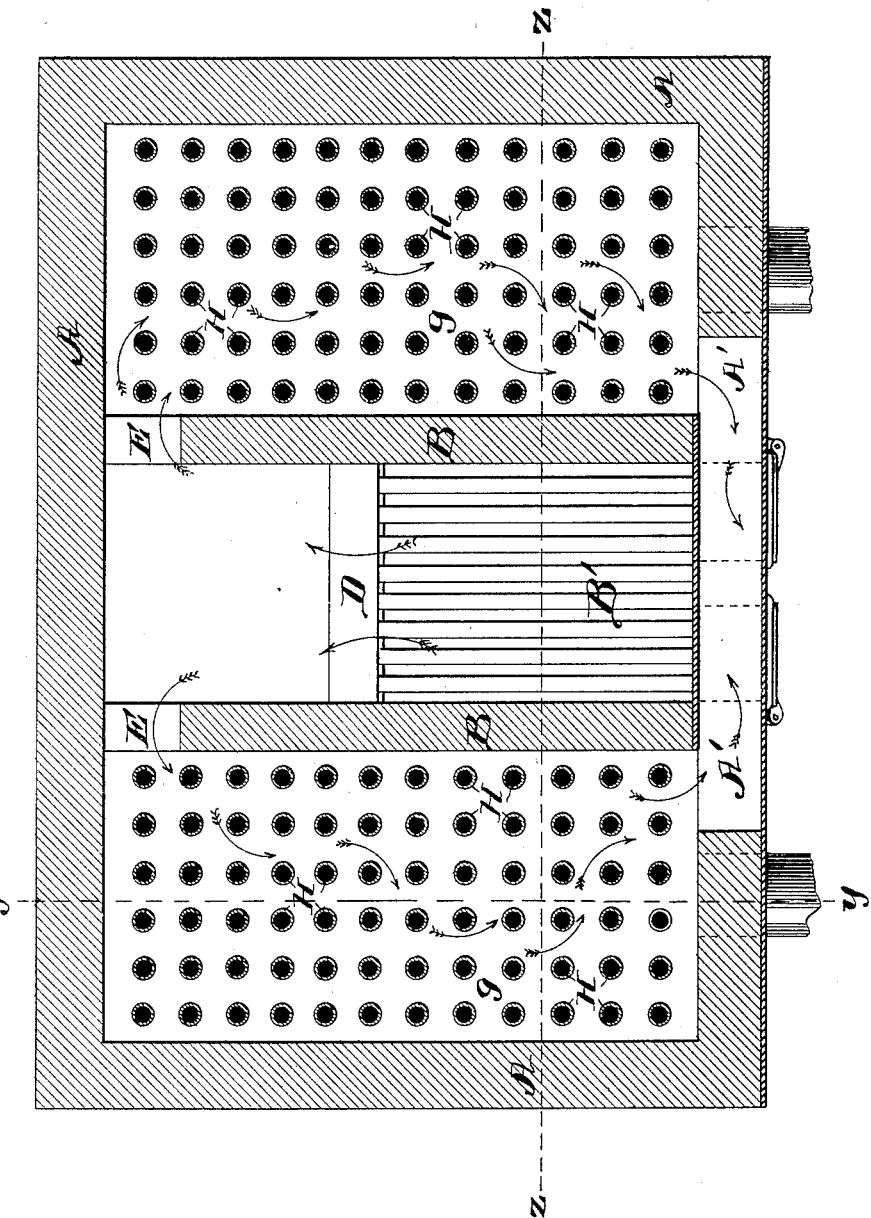
Figure 2:
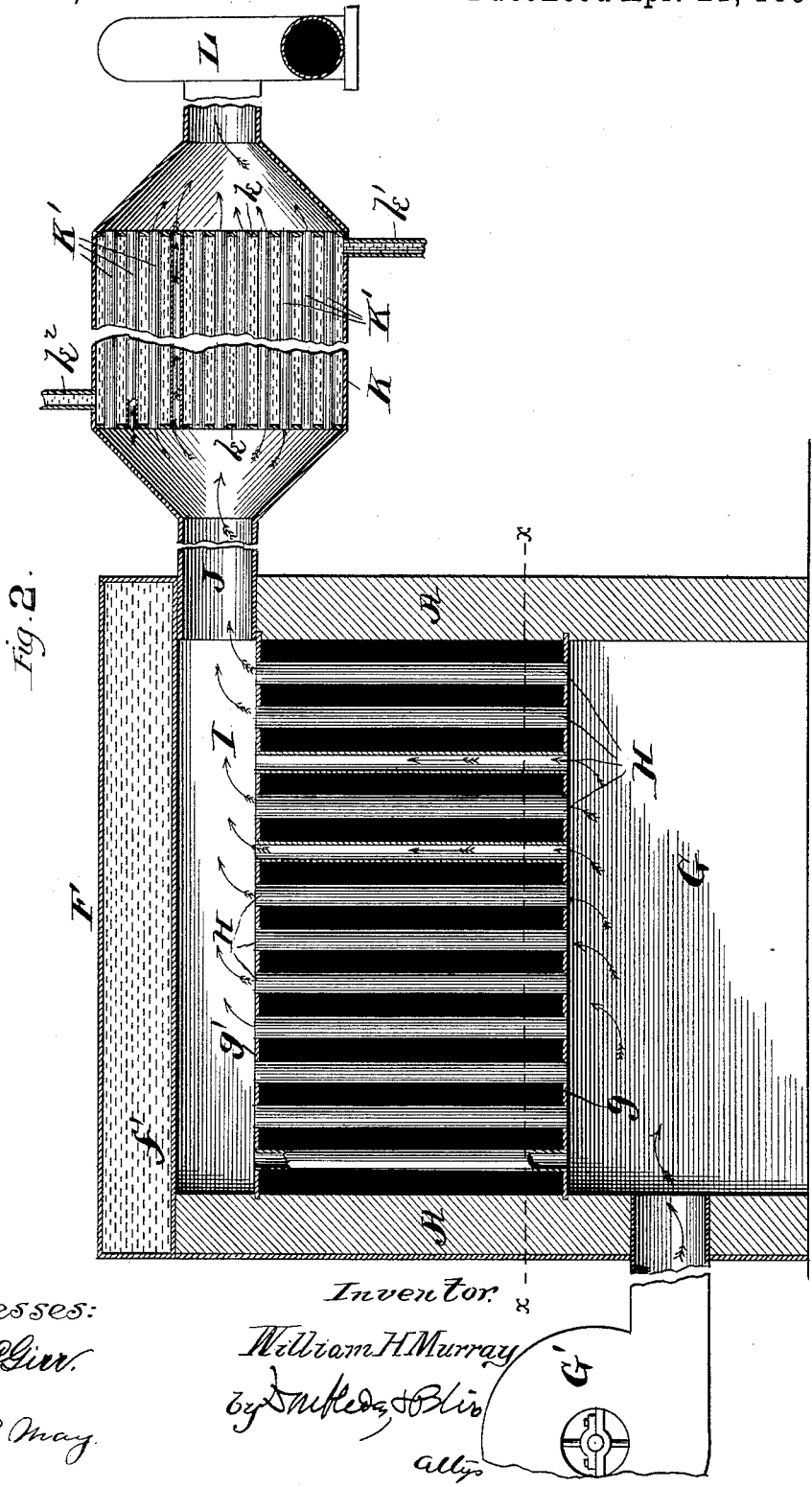
Figure 3:
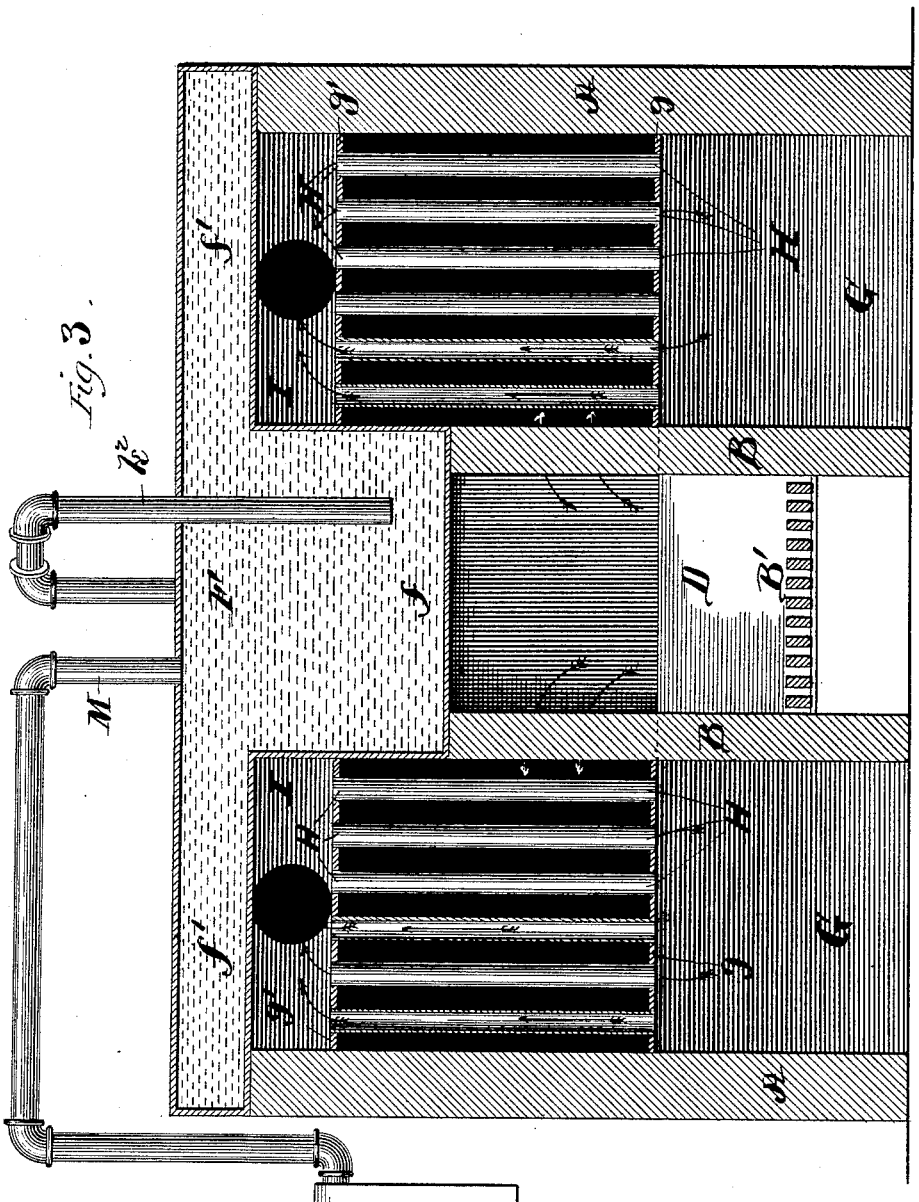
Figure 4:
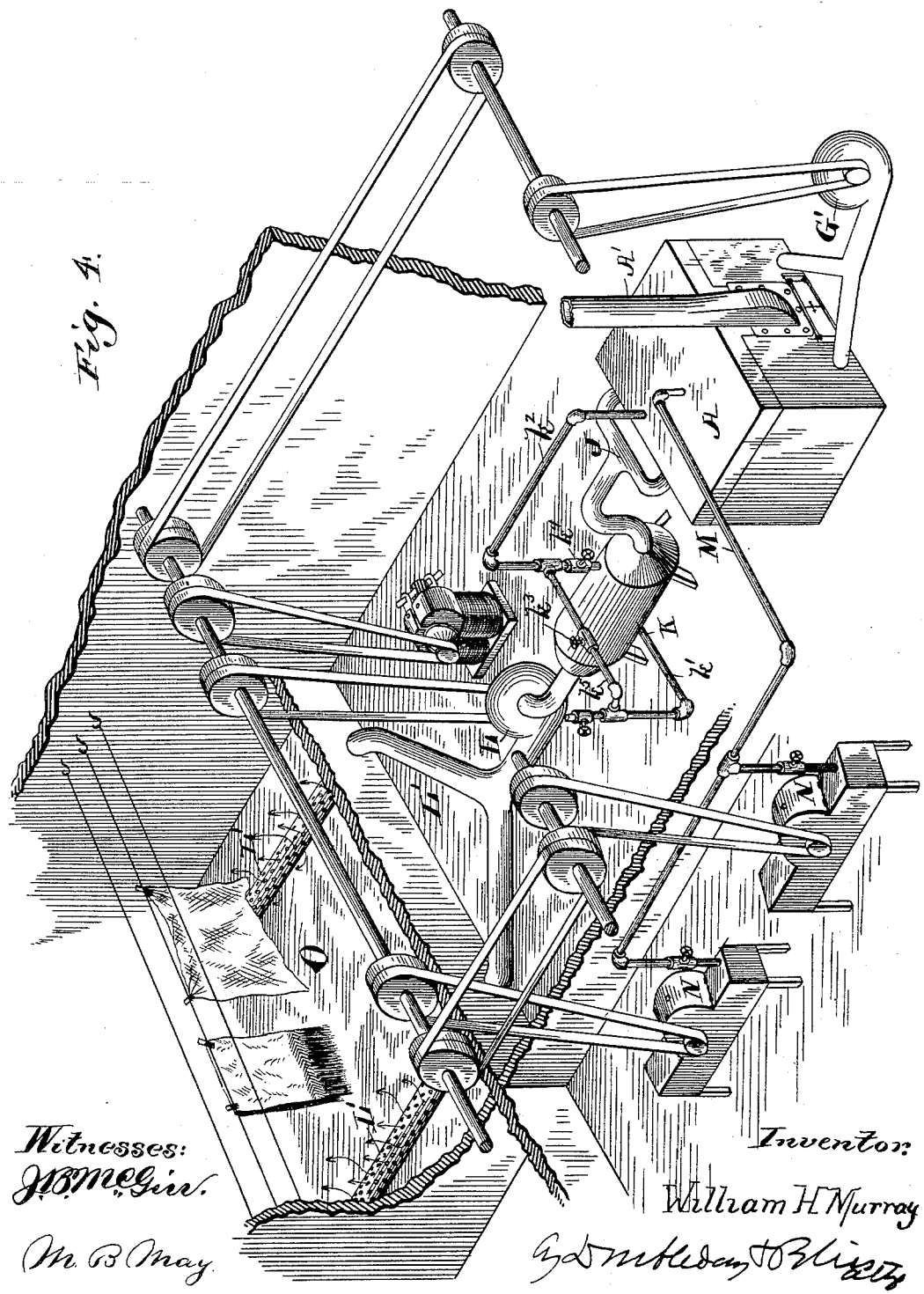

Figure 1 is a horizontal section on the line $x\ x$ of Fig. 2, showing some of the apparatus embodying my improvements. Fig. 2 is a vertical section on the line $y\ y$, Fig. 1. Fig. 3 is a vertical section on the line $z\ z$ of Fig. 1. Fig. 4 is a perspective showing a laundry plant provided with my improvements.

In the drawings, A A indicate the main walls of a furnace or heater. The inclosure within these walls is divided into three compartments by means of two walls B B. The interior chamber is utilized as a fire-chamber, the grate being shown at B', with a bridge-wall at D.

At E E there are flues through the walls B B, by which the products of combustion pass from the fire-chamber into the outside compartments. Each of these compartments is provided with a set of air-ducts through which currents of air can be taken independently of the products of combustion.

As shown, each of the side chambers has a lower and an upper horizontal wall or diaphragm $g\ g'$, made of metal, sheet or cast, or other suitable material, and in these are secured vertically-arranged air-pipes H. Below each set of pipes there is an air-inlet chamber G, and above them an outlet-chamber I. The spaces between the partitions or diaphragms $g\ g'$ constitute parts of the escape-passages for the products of combustion. The latter, after leaving these chambers, enter a smoke-stack or exhaust-pipe through the flues at A'. The upper air-chambers I communicate through flues J with an air-cooling mechanism. (Indicated as whole by K.) As shown, it is formed with partitions or diaphragms $k$, into which are fitted air-tubes K'. The chamber or space around these tubes and between the diaphragms $k\ k$ is adapted to receive and hold a body of water, for supplying which the inlet-pipe $k'$ is used and for whose withdrawal there is an outlet $k^2$.

G' indicates a blower or fan of any suitable construction communicating with the inlet-air chambers G. I prefer to also employ a suction-fan, as at L, for drawing the air through the tempering devices at K.

F represents a boiler or receptacle for holding a body of water in immediate proximity to, and preferably above, the heater or furnace. As shown, it is formed of sheet-iron with the central drooping bottom $f$ and the higher parts $f'\ f'$, the former being directly over the fire-chamber and the latter forming part of the walls of the upper air-chambers I. The water is supplied to this boiler or receptacle through the above-described pipe $k^2$ from the air-tempering devices at K. Through the pipe M the water can be withdrawn from the boiler as wanted and carried to a receptacle of any sort, as shown at N.

The method of operating the devices above described will be readily understood. If it be supposed that there is a fire in the chamber B' and that a current of air is being forced through the parts G, H, I, J, K, and L, it will be seen that as the products of combustion pass through the side chambers around the pipes H, taking the directions of the arrows shown in Fig. 1; said pipes and their contained air will become highly heated, the temperature being regulated according to the purpose aimed at. It is now well known that if a body of air is to be utilized for drying purposes it can be made most efficient by subdividing it into a number of currents of relatively small diameter and applying to it a high degree of heat, a degree, in fact, higher than that at which it is intended to use it, in order to insure that every particle of it shall be thoroughly heated, and then, before applying it to the articles to be desiccated, lowering its temperature to the desired point, thus insuring a perfect uniformity of temperature throughout the whole mass. This is in contradistinction from the method of treating the air, which consists in merely passing it in large volumes or currents of long transverse diameter over heated surfaces through large chambers or pipes and then delivering it directly to the articles to be dried. It is also well known that the application of a high degree of heat to bodies of air results in the destruction of foreign bodies, especially vitalized organic matter, which may be suspended therein, and that air freed therefrom is of superior quality for the desiccating of many materials, such as meats and the various foods; and, again, not only can the humidity of the air be relatively lowered in the manner herein provided for, but can be absolutely lowered, if the surfaces of the air-ducts be heated to a sufficiently high point, so that it (the air) becomes thereby a still more efficient drying agent; but in either of the cases referred to it becomes necessary, after permitting the heat to do its work, to lower the temperature before applying it to the material to be dried, almost all of the substances which, in the various arts are desiccated, being treated with the best effects when the air is at a temperature neighboring upon 100° Fahrenheit. But much of the exceedingly high heat which I employ is in danger of being wasted, not only at points immediately in proximity to the fire-chamber, but also because of the above-described fact that after heating the air I withdraw more or less of the heat therefrom. This surplus or waste heat I make a second time available by conducting it into a body of water which can be thereby used for any desired purpose, and can be subsequently heated to a higher point, if desired.

In almost all of the establishments where materials are manufactured or treated which at one stage or another require desiccation use is made of engines or of boilers, and heretofore in such establishments two or more separate and independent fires have been employed, one for heating the water in such boiler and another in connection with the drying apparatus, and in consequence there has been such a waste of fuel that the desiccating processes have been found very expensive, and in many of the arts their respective materials when manufactured or handled on large scale are still submitted to the ordinary action of the elements (as the open air, solar heat, &c.) for drying them. It will be seen that the water holder or boiler F is so situated relatively to the initial air-passages that any waste or surplus heat not imparted to the currents of air will be conducted by the thin-metal walls $f\ f'$ directly to the water. After the air reaches the tempering devices at A its temperature will be lowered to an extent proportional to the quantity and character of the water or other tempering agent present in the chamber around the ducts $k'$. If the air is heated up to several hundred degrees Fahrenheit, the water in this chamber will be heated considerably, and as this water is subsequently conveyed into the boiler or receptable F the heat contained in it is utilized. The air which escapes from the tempering devices at K can be used for any of many purposes, as will be understood.

The mechanism, as shown, is particularly well adapted for economically and efficiently preparing both the air and the water which are necessary for carrying on laundry operations on a large scale. The heated water can be used either for the generation of steam for driving machinery or can be conveyed to the tubs or receptacles wherein articles are washed, and the air delivered from the fan L can be forced in large volumes into the apartments where the articles are exposed for drying; but the great advantage possessed by the devices herein set forth for the particular purpose last referred to—namely, for heating the air and the water used in laundries—is that by means of them I have succeeded in doing away entirely with the large boilers commonly used in such places for the generation of steam.

In order that my invention when applied to laundry purposes may be fully understood, I will briefly call attention to the devices used in all laundries at present with which I am acquainted—that is, in those in which work is carried on to such extent as to require the presence of power machinery. First, large boilers are present and correspondingly-large furnaces for the purpose of generating sufficient steam to drive the machinery, to heat the washing-water, and to supply the dry-rooms or the pipes therein. The drying-rooms are closed compartments provided with coils of pipes to receive the steam from the boilers or from the engines, and the clothes are introduced and supported on sliding racks. The heat in these drying-rooms is high, at many times intense, in order to effect the drying rapidly, and is necessarily so owing to the principle of construction of the rooms and the principle involved in the drying operation. Again, the heat is exceedingly high throughout all of the rooms, owing to the proximity of the highly-heated boilers and the steam-pipes nesessarily present.

With devices such as those I have herein shown in Fig. 4 (which illustrate the parts shown in detail in the other figures, in conjunction with others constituting a laundry plant) it is possible to carry on all the necessary operations and yet avoid the exceedingly high heat which is experienced in laundries as they are at present constructed. A relatively low temperature can be maintained not only in the drying-room, but throughout all the parts of the plant, as it is not necessary in any case to generate in the furnace a heat beyond that which is represented by the boiling-point, (or thereabout.) Of course the air is primarily heated to a higher point, but it is almost immediately thereafter cooled, as above described, the water being the medium for effecting this; and having thus provided for a large body of drying and ventilating air and a sufficient body of heated water the power necessary to actuate the various machines can be readily supplied from an electric motor, which, as is well known, dispenses with a highly-heated agency, such as steam.

The air which I deliver to the drying-room is in a forced circulation, and therefore operates in a manner much superior to that in which the highly-heated steam-ducts act in a tightly-closed compartment. The temperature of this dry air being comparatively low, its action on the articles of clothing (upon some articles particularly) is radically different from and better than the action of the exceedingly highly-heated contents (moisture-charged air) of the ordinary laundry drying-room.

As illustrated in Fig. 4, the suction-fan F drives the air through ducts L' L' into the drying-room O. The water is received from the outside main or other supply and carried through the aforesaid pipe $k'$ to the tempering device at K. There is a pipe at $k^5$, by which it can go direct to the boiler-pipe $k^2$ when it is desired to stop or modify the cooling action, and by means of the valves at $k^4$ $k^5$ any desired temperatures of the air can be attained, as the amount of water passing through the cooler can be graduated as desired.

The electric motor is connected by shafts and belting with the fans at G' and L, and also with the washing-machines at N N, which receive the heated water.

Of course, as concerns the novel features of construction and arrangement of the parts of the heater and cooler or air and water tempering devices, the invention herein is not limited to a specific apparatus, such as shown in Fig. 4; but that particular construction and arrangement of the parts of a plant of that character possess many novel and desirable characteristics.

The boiler may be made of any suitable material other than sheet-iron. The furnace can be made of masonry, iron, or any suitable material, as is preferred.

What I claim is—

1. The combination of the fire-chamber, the air-ducts placed in the escape-passages of the products of combustion, the air-cooling mechanism, the boiler directly upon or above said fire-chamber, whereby it is impinged on by the products of combustion, the water-chamber in the air-cooling mechanism, and the duct for carrying water from said chamber to the boiler, substantially as set forth.

2. The combination of the fire-chamber B', the chamber at the sides thereof having the air-heating pipes, the flues connecting the air-chamber with the spaces around said pipe, the air-outlet chambers I, the boiler having its walls arranged to form a part of said chambers I, the air-cooler, the blast-fan, and the suction-fan, substantially as set forth.

3. The combination of the fire-chamber, the chambers at the side thereof, the water-receptacle directly above the fire-chamber and having its walls arranged to form parts of the said side chambers, the air-heating tubes, the cooler having an air-chamber communicating with said tubes, and a water-chamber communicating with said boiler, substantially as set forth.

In testimony whereof I affix my signature in presence of two witnesses.

WILLIAM HENRY MURRAY.

Witnesses:
FRANCIS A. RIDDLE,
WILLIAM G. COOKE.